United States Patent
Tanimoto et al.

(12) 
(10) Patent No.: US 6,722,156 B2
(45) Date of Patent: Apr. 20, 2004

(54) REFRIGERATION SYSTEM

(75) Inventors: Kenji Tanimoto, Osaka (JP); Takeo Ueno, Osaka (JP); Masaaki Takegami, Osaka (JP); Kazuyoshi Nomura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 18 days.

(21) Appl. No.: 10/162,703

(22) Filed: Jun. 6, 2002

(65) Prior Publication Data

US 2003/0226370 A1 Dec. 11, 2003

(51) Int. Cl.⁷ .................................................. F25B 1/10
(52) U.S. Cl. ........................................... 62/510; 62/498
(58) Field of Search .......................... 62/510, 498, 335, 62/259.2

(56) References Cited

U.S. PATENT DOCUMENTS 5,235,820 A   8/1993   Radermacher et al.

FOREIGN PATENT DOCUMENTS

| EP | 0 553 892 A2 | 8/1993 |
|---|---|---|
| JP | 54-042460 | 12/1979 |
| JP | 63-040758 | 10/1988 |
| JP | 02-010063 A | 1/1990 |
| JP | 02-033096 | 9/1990 |
| JP | 06-003326 | 1/1994 |
| JP | 06-159738 A | 6/1994 |
| JP | 07-071844 A | 3/1995 |
| JP | 07-083520 A | 3/1995 |

*Primary Examiner*—Chen Wen Jiang
(74) *Attorney, Agent, or Firm*—Nixon Peabody LLP; Donald R. Studebaker

(57) ABSTRACT

A refrigeration system includes a chiller unit and a freezer unit. The freezer unit is provided with a freezing compressor for compressing a refrigerant in a total of two stages together with a compressor in an outdoor unit. The freezing compressor is formed by an inverter compressor. An oil separator is disposed on the discharge pipe of the freezing compressor. On the inlet pipe of the freezing compressor, a heat exchanger is provided for cooling an inverter with an refrigeration oil separated by the oil separator and a suction refrigerant.

14 Claims, 7 Drawing Sheets

REFRIGERATION SYSTEM

BACKGROUND OF THE INVENTION (a) Field of the Invention

This invention relates to a refrigeration system having at least a freezer unit.

(b) Description of Related Art

In refrigeration systems used in convenience stores, for example, the temperature level for cooling differs for different types of objects being cooled such as foods and drinks. For this reason, refrigeration systems having a chiller unit and a freezer unit are conventionally used.

In a freezer unit, an object being cooled need to be cooled to a lower temperature than in a chiller unit, and therefore a refrigerant must be reduced in pressure to a considerably lower pressure. However, if the refrigerant pressure difference in a refrigerant circuit becomes large, the efficiency of a compressor therein will be decreased. To cope with this, a conventional refrigeration system, as shown in FIG. 7, is provided with a cascade unit (106) having a lower-temperature-side compressor (107) and a cascade condenser (108) separately from a heat source side unit (103) having a heat source side compressor (101) and a heat source side heat exchanger (102), a chiller unit (104) and a freezer unit (105), thereby forming a binary refrigeration cycle. The amount of heat exchange of the cascade condenser (108) depends upon the amount of refrigerant supplied from a receiver (109). Therefore, the amount of heat exchange of the cascade condenser (108) is subject to the operating conditions at that time.

The conventional refrigeration system, however, has its occupying space increased by the placement of the cascade unit (106). Further, its cost is relatively high by the necessity of the cascade condenser (108).

The present invention has been made in view of these circumstances, and therefore its object is to promote space saving and cost reduction for a refrigeration system including a freezer unit and one or more other units.

SUMMARY OF THE INVENTION

A refrigeration system according to the present invention is a refrigeration system including a refrigerant circuit formed by connecting at least all of: a heat source side unit having a heat source side compressor and a heat source side heat exchanger; a chiller unit having a chilling heat exchanger for cooling an object being cooled; and a freezer unit having a freezing heat exchanger for cooling an object being cooled at a lower temperature than the chilling heat exchanger, wherein the freezer unit is provided with a freezing compressor for compressing a refrigerant in a total of two stages together with the heat source side compressor.

In the above refrigeration system, the freezer unit is provided with a freezing compressor and a two-stage compression refrigeration cycle is established by the freezing compressor and the heat source side compressor. Accordingly, the system needs no cascade condenser in spite of a so-called multi-circuit type including the chiller unit and the freezer unit, which allows the system to be entirely reduced in size and promotes cost reduction thereof Further, it is possible to avoid a heat loss in the cascade condenser and thereby enhance operating efficiency.

Another refrigeration system according to the present invention is a refrigeration system including a refrigerant circuit formed by connecting at least all of: a heat source side unit having a heat source side compressor and a heat source side heat exchanger; a room air conditioning unit having an indoor heat exchanger for heating or cooling room air; and a freezer unit having a freezing heat exchanger for cooling an object being cooled, wherein the freezer unit is provided with a freezing compressor for compressing a refrigerant in a total of two stages together with the heat source side compressor.

In the above refrigeration system, the freezer unit is provided with a freezing compressor and a two-stage compression refrigeration cycle is established by the freezing compressor and the heat source side compressor. Accordingly, the system needs no cascade condenser in spite of a so-called multi-circuit type including the room air conditioning unit and the freezer unit, which allows the system to be reduced in size and promotes cost reduction thereof Further, it is possible to enhance operating efficiency.

Still another refrigeration system according to the present invention is a refrigeration system including a refrigerant circuit formed by connecting at least all of: a heat source side unit having a heat source side compressor and a heat source side heat exchanger; a room air conditioning unit having an indoor heat exchanger for heating or cooling room air; and a chiller unit having a chilling heat exchanger for cooling an object being cooled; and a freezer unit having a freezing heat exchanger for cooling an object being cooled at a lower temperature than the chilling heat exchanger, wherein the freezer unit is provided with a freezing compressor for compressing a refrigerant in a total of two stages together with the heat source side compressor.

In the above refrigeration system, the freezer unit is provided with a freezing compressor and a two-stage compression refrigeration cycle is established by the freezing compressor and the heat source side compressor. Accordingly, the system needs no cascade condenser in spite of a so-called multi-circuit type including the room air conditioning unit, the chiller unit and the freezer unit, which allows the system to be reduced in size and promotes cost reduction thereof. Further, it is possible to enhance operating efficiency.

The freezer unit may include a pressure reduction mechanism and may be connected to a liquid-side pipe branched from a liquid line of the heat source side unit and a gas-side pipe branched from a gas line of the heat source side unit, and the freezer unit may be constructed so that in a direction from the liquid-side pipe to the gas-side pipe, the pressure reduction mechanism, the freezing heat exchanger and the freezing compressor are connected in this order.

The freezer unit is preferably provided with: an oil separator disposed on the discharge side of the freezing compressor; and an oil return pipe which have a pressure reduction mechanism and connects the oil separator to the suction side of the freezing compressor therethrough.

In the above refrigeration system, an effluent refrigeration oil from the freezing compressor is returned thereto again through the oil separator and the oil return pipe, so that lubrication failure in the freezing compressor can be surely prevented. During the shut-down of the freezing compressor, oil in the oil separator is returned to the suction side of the freezing compressor through the oil return pipe, and therefore there never occurs a phenomenon that during the shut-down, the oil would flow backward to the discharge side of the compressor. Accordingly, the oil never resides at the discharge side of the freezing compressor so that the freezing compressor can be smoothly restarted.

Preferably, the freezing compressor is formed by an inverter compressor, and the oil return pipe in the freezer unit or an inlet pipe of the freezing compressor is provided with a heat exchanger for cooling an inverter in the inverter compressor with at least a refrigeration oil separated by the oil separator.

In the above refrigeration system, since the discharge side of the freezing compressor has a relatively low pressure, it has a relatively low temperature. Therefore, the refrigeration oil returned from the oil separator to the freezing compressor through the oil return pipe also has a relatively low temperature. Since the heat exchanger is provided on the oil return pipe or the inlet pipe, the inverter is cooled through the heat exchange at least with the low-temperature refrigeration oil. As a result, the system is difficult to cause failure due to overheat of the inverter. This enhances the reliability of the freezing compressor.

According to the present invention, no cascade condenser is needed in a refrigeration system of a so-called multi-circuit type that includes a freezer unit and one or more other heat utilization side units. Hence, space saving and cost reduction for the system can be achieved.

If an oil separator is provided on the discharge side of the freezing compressor so that a refrigeration oil separated by the oil separator is recovered into the freezing compressor through the oil return pipe, the reliability of the freezing compressor and further the reliability of the refrigeration system can be enhanced.

If the freezing compressor is formed by an inverter compressor and a heat exchanger is provided for cooling the inverter with at least the refrigeration oil separated by the oil separator, the cold heat of the refrigeration oil can prevent the inverter from overheating. Accordingly, the reliability of the inverter compressor can be enhanced without using any external cooling source, thereby enhancing the reliability of the refrigeration system.

DESCRIPTION OF THE PREFERRED EMBODIMENT

Hereinafter, an embodiment of the present invention will be described with reference to the drawings.

Construction of Refrigeration System

Figure 1:
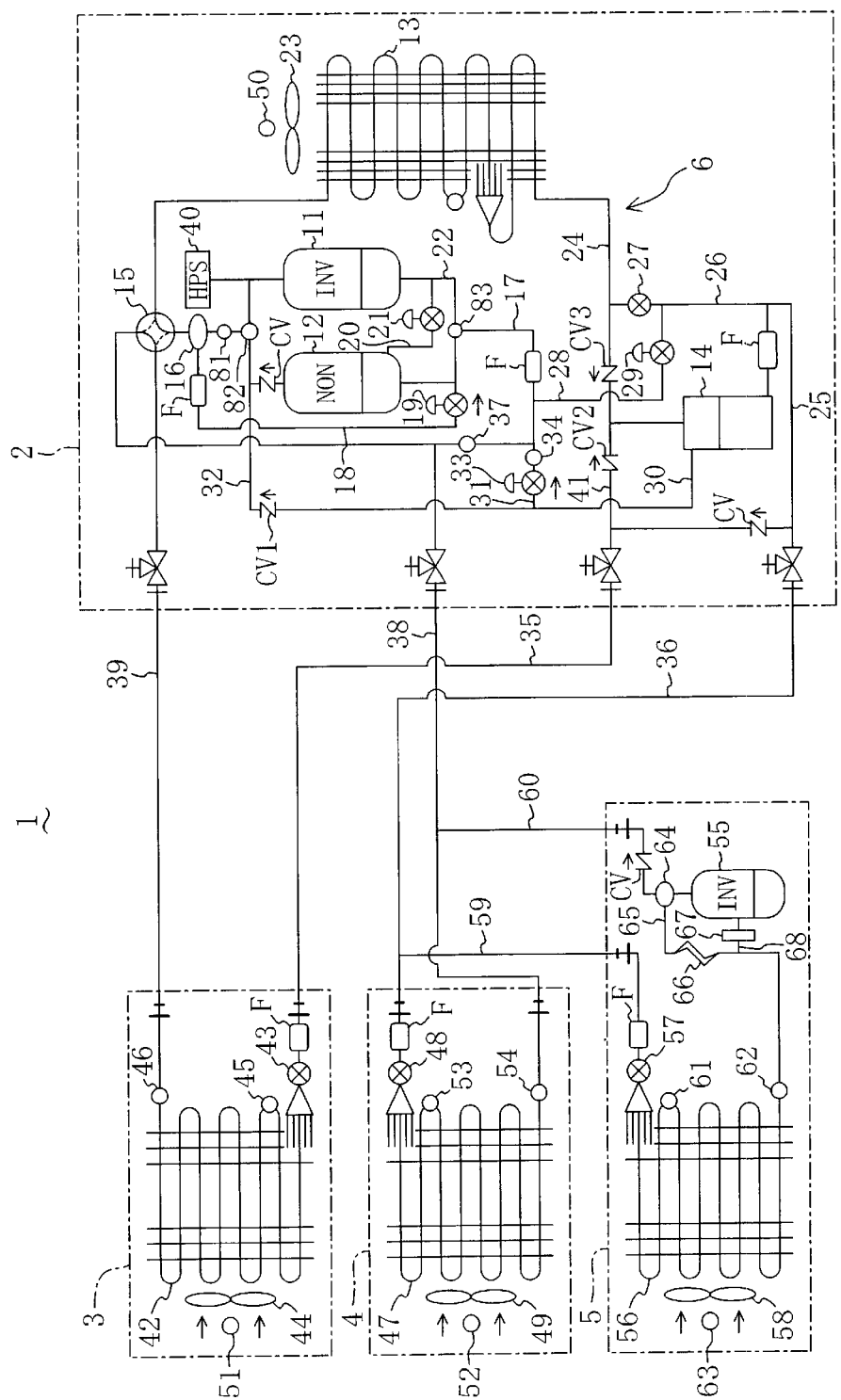
FIG. 1 is a refrigerant circuit diagram of a refrigeration system according to an embodiment.

As shown in FIG. 1, a refrigeration system (1) according to the present embodiment is a refrigeration system for performing room air-conditioning, and chilling and refrigeration of foods and drinks, and is intended for being placed in convenience stores. The refrigeration system (1) includes a refrigerant circuit (6) formed by connecting an outdoor unit (2), an indoor unit (3), a chiller unit (4) and a freezer unit (5). The outdoor unit (2) is a heat source side unit, while the indoor unit (3), the chiller unit (4) and the freezer unit (5) are heat utilization side units. The refrigerant circuit (6) is a so-called multi-circuit.

The outdoor unit (2) is provided with first and second compressors (11, 12) connected in parallel, an outdoor heat exchanger (13), and a receiver (14). The first compressor (11) is of a variable capacity type and is formed by an inverter compressor. The second compressor (12) is of a fixed capacity type and is formed by a non-inverter compressor. A four-way selector valve (15) is provided on the discharge side of the compressors (11, 12). Discharge pipes of the compressors (11, 12) are connected to a first port of the four-way selector valve (15) (the lower port in FIG. 1). An oil separator (16), a temperature sensor (81), and a pressure sensor (82) are provided between the compressors (11, 12) and the four-way selector valve (15). A high pressure switch (40) is provided on the discharge pipe of the first compressor (11). A pressure sensor (83) is provided on the inlet line (17) for the compressors (11, 12). An oil return pipe (18) connects the oil separator (16) and the inlet line (17). A solenoid valve (19) is provided on the oil return pipe (18). One end of an oil-equalizing pipe (20) for the compressors (11, 12) is connected to a side portion of the second compressor (12), while the other end of the oil-equalizing pipe (20) is connected to an inlet pipe (22) of the first compressor (11). A solenoid valve (21) is provided on the oil-equalizing pipe (20).

A second port of the four-way selector valve (15) (the right-side port in FIG. 1) is connected to one end of the outdoor heat exchanger (13) through a refrigerant pipe. The other end of the outdoor heat exchanger (13) is connected to the receiver (14) through a refrigerant pipe (24). A liquid-side pipe (25) of the receiver (14) is connected to the refrigerant pipe (24) through a bypass pipe (26). An electronic expansion valve (27) is provided on the bypass pipe (26). One end of a refrigerant pipe (28) is connected between the electronic expansion valve (27) and a junction of the bypass pipe (26) with the liquid-side pipe (25). The other end of the refrigerant pipe (28) is connected to the inlet line (17). A solenoid valve (29) is provided on the refrigerant pipe (28).

A gas-side pipe (30) of the receiver (14) is branched so that one of branch pipes (31) is connected to the inlet line (17) and the other branch pipe (32) is connected to the discharge pipe of the second compressor (12). Provided on the branch pipe (31) are a solenoid valve (33) and a temperature sensor (34). Provided on the branch pipe (32) is a check valve (CV1) for prohibiting the flows of refrigerant from the compressors (11, 12).

The liquid-side pipe (25) of the receiver (14) is branched into two refrigerant pipes (35, 36), and the refrigerant pipes (35, 36) extend outside of the outdoor unit (2). The refrigerant pipe (35) is connected to the portion of the refrigerant pipe (24) closer to the receiver (14) through a refrigerant pipe (41). Provided on the refrigerant pipe (41) is a check valve (CV2) for prohibiting the flow of refrigerant from the receiver (14). Also provided on the refrigerant pipe (24) is a check valve (CV3) for prohibiting the flow of refrigerant from the receiver (14).

The inlet line (17) of the compressors (11, 12) is connected to a third port of the four-way selector valve (15) (the upper port in FIG. 1). A temperature sensor (37) is provided on the inlet line (17). A refrigerant pipe (38) extending outside of the outdoor unit (2) is connected to a portion of the inlet pipe (17) located between a junction thereof with the four-way selector valve (15) and a junction thereof with the branch pipe (31).

A fourth port of the four-way selector valve (15) (the left-side port in FIG. 1) is connected to a refrigerant pipe (39) extending outside of the outdoor unit (2). The four-way selector valve (15) is set to be freely changeable between first and second positions described later. The first position is the position which allows the first port to communicate with the second port and the third port to communicate with the fourth port. The second position is the position which allows the first port to communicate with the fourth port and the second port to communicate with the third port.

The outdoor unit (2) is provided with an outdoor fan (23) for supplying air to the outdoor heat exchanger (13), and a temperature sensor (50) for detecting an outside air temperature.

The indoor unit (3) is for performing room air-conditioning, and includes an indoor heat exchanger (42), an indoor electronic expansion valve (43) and an indoor fan (44). One end of the indoor heat exchanger (42) is connected to the refrigerant pipe (39). The other end of the indoor heat exchanger (42) is connected to the refrigerant pipe (35). The indoor electronic expansion valve (43) is provided on the refrigerant pipe (35). The indoor heat exchanger (42) is provided with a temperature sensor (45), and the refrigerant pipe (39) is provided with a temperature sensor (46). Indicated by (51) is a temperature sensor for detecting a room air temperature.

The chiller unit (4) is for chilling foods and drinks, and includes a chilling cooler (47), a chilling electronic expansion valve (48), and a chilling fan (49). One end of the chilling cooler (47) is connected to the refrigerant pipe (36). The other end of the chilling cooler (47) is connected to the refrigerant pipe (38). The chilling electronic expansion valve (48) is provided on the refrigerant pipe (36). The chilling cooler (47) is provided with a temperature sensor (53), and the refrigerant pipe (38) is provided with a temperature sensor (54). Indicated by (52) is a temperature sensor for detecting an in-unit temperature.

The freezer unit (5) is for freezing foods and drinks, and includes a freezing compressor (55), a freezing cooler (56), a freezing electronic expansion valve (57), and a freezing fan (58). The freezer unit (5) is connected to a refrigerant pipe (59) branched from the refrigerant pipe (36), and a refrigerant pipe (60) branched from the refrigerant pipe (38). The freezing electronic expansion valve (57), the freezing cooler (56) and the freezing compressor (55) are connected in this order. The freezing electronic expansion valve (57) is connected to the refrigerant pipe (59), and the discharge side of the freezing compressor (55) is connected to the refrigerant pipe (60). A temperature sensor (61) is provided in the freezing cooler (56), and a temperature sensor (62) is provided on an outlet-side pipe of the freezing cooler (56) (i.e., a pipe between the freezing cooler (56) and the freezing compressor (55)). Indicated by (63) is a temperature sensor for detecting an in-unit temperature.

The freezing compressor (55) is of a variable capacity type and is formed by an inverter compressor. An oil separator (64) is provided on a discharge pipe of the freezing compressor (55). An oil return pipe (65) of the oil separator (64) is connected to an inlet pipe (68) of the freezing compressor (55). The oil return pipe (65) is provided with a capillary tube (66) as a pressure reduction mechanism. The inlet pipe (68) is provided with a heat exchanger (67) for cooling the inverter in the freezing compressor (55).

Figure 2B:
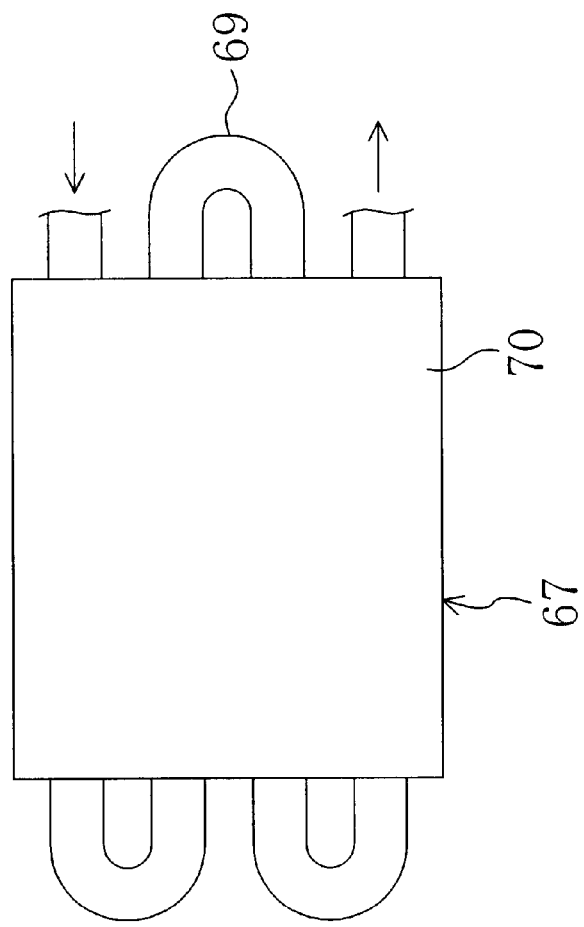
FIG. 2B is a front view of the heat exchanger.
Figure 2A:
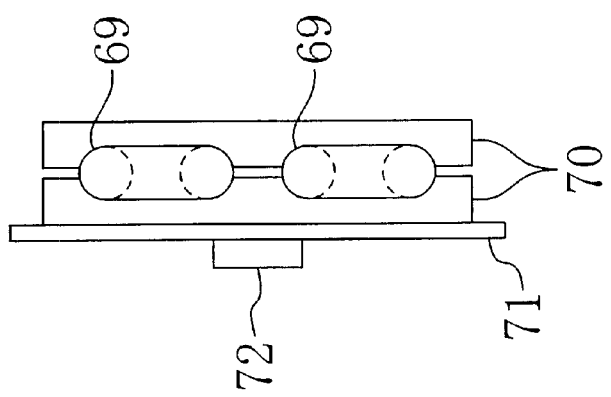
FIG. 2A is a side view of a heat exchanger for cooling an inverter.

As shown in FIGS. 2A and 2B, the heat exchanger (67) is formed by fixing aluminum plates (70) to both sides of a refrigerant pipe (69) continued to the inlet pipe (68), respectively. The refrigerant pipe (69) meanders. The aluminum plate (70) is provided with a plurality of grooves in semi-circular cross section in order to extend its contact area with the refrigerant pipe (69). The refrigerant pipe (69) is fitted into the grooves. The heat exchanger (67) is secured to a fixed plate (71) that supports an inverter (72) thereon, and comes into direct contact with the fixed plate (71).

It should be noted that the above-mentioned structure of the heat exchanger (67) is illustrative only. The heat exchanger (67) need only have the function of cooling the inverter (72) with a refrigeration oil returned from the oil separator (64) or a suctioned refrigerant, but no special limitation is imposed on its structure.

When an inverter-integrated fan is used as the freezing fan (58), the heat exchanger (67) may cool not only the inverter (72) in the freezing compressor (55) but also the inverter in the freezing fan (58).

In FIG. 1, (CV) denotes a check valve and (F) denotes a filter.

Operations of Refrigeration System
<Cooling Operation>

Figure 3:
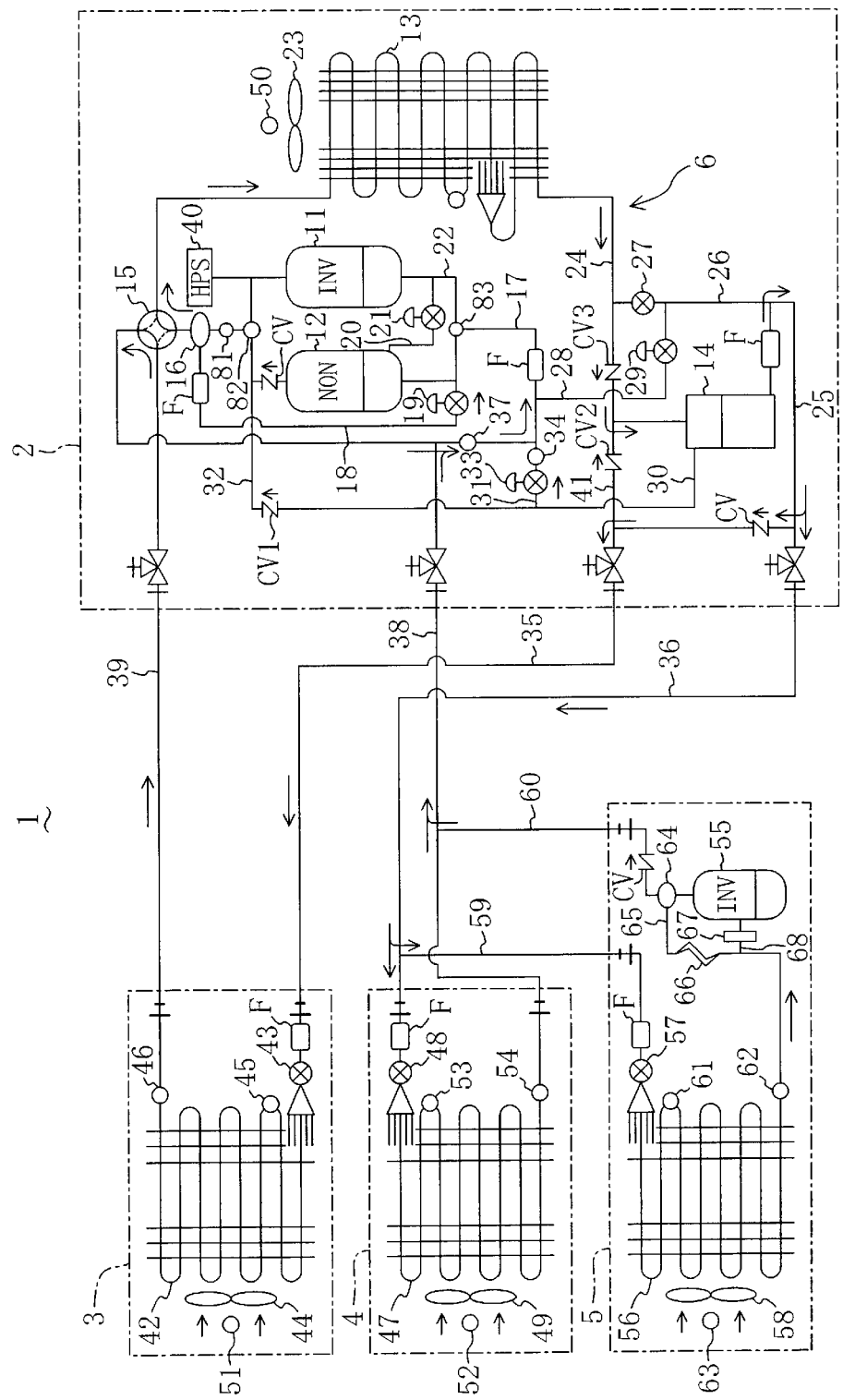
FIG. 3 is a refrigerant circuit diagram for illustrating the circulation behavior of a refrigerant during a cooling operation.

In cooling operation, the four-way selector valve (15) is set into a position (first position) in which the first port communicates with the second port and the third port communicates with the fourth port. The electronic expansion valve (27) in the outdoor unit (2) is set into a fully closed position. Then, the refrigerant in the refrigerant circuit (6) circulates as shown in FIG. 3.

More specifically, the refrigerant discharged from the compressors (11, 12) condenses in the outdoor heat exchanger (13) and then flows into the receiver (14). The refrigerant in the receiver (14) flows out of the outdoor unit (2), and is then divided into a flow toward the indoor unit (3), a flow toward the chiller unit (4) and a flow toward the freezer unit (5). The influent refrigerant in the indoor unit (3) is reduced in pressure by the indoor electronic expansion valve (43), and then evaporates in the indoor heat exchanger (42) to cool room air. The influent refrigerant in the chiller unit (4) is reduced in pressure to a first predetermined pressure PL1 by the chilling electronic expansion valve (48) (see FIG. 4), and then evaporates in the chilling cooler (47) to cool in-unit air.

On the other hand, the influent refrigerant in the freezer unit (5) is reduced in pressure to a second predetermined pressure PL2 lower than the first predetermined pressure PL1 by the freezing electronic expansion valve (57). The pressure-reduced refrigerant evaporates in the freezing cooler (56) to cool in-unit air. The effluent refrigerant from the freezing cooler (56) is raised in pressure to the first predetermined pressure PL1 by the freezing compressor (55), merges with the effluent refrigerant from the chilling cooler (47), and then flows together into the outdoor unit (2). The influent refrigerant in the outdoor unit (2) merges with the refrigerant returning from the indoor unit (3) to the outdoor unit (2), and is sucked together into the compressors (11, 12).

Figure 4:
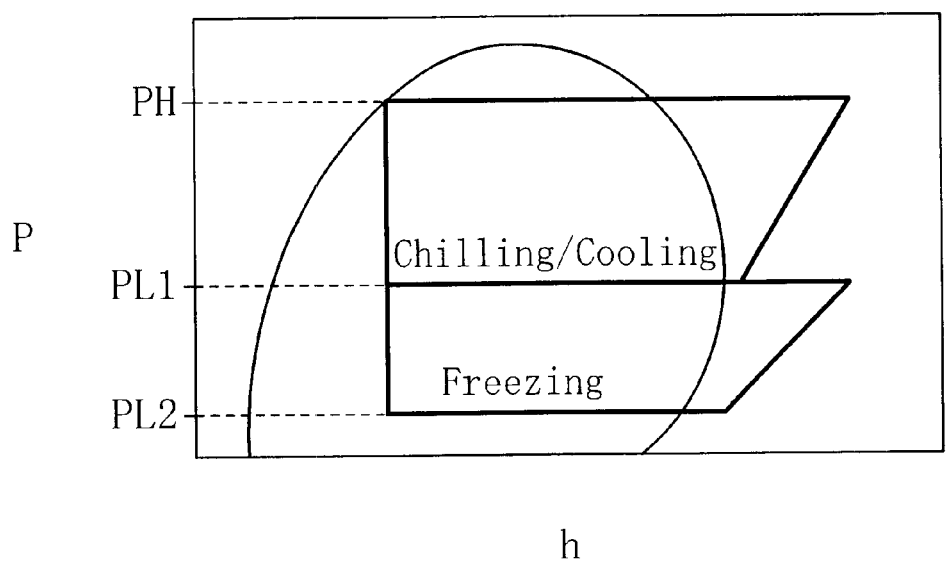
FIG. 4 is a Mollier chart of a refrigeration cycle according to the embodiment.

The refrigerant sucked into the compressors (11, 12) is compressed by the compressors (11, 12) and then repeats the circulation behavior as described above. This operation establishes a two-stage compression refrigeration cycle as shown in FIG. 4 in the refrigerant circuit (6).

In the freezer unit (5), the refrigeration oil separated by the oil separator (64) returns to the inlet pipe (68) through the oil return pipe (65) and is recovered into the freezing compressor (55). In this case, the refrigeration oil is heat exchanged, together with the suction refrigerant, with the inverter (72) through the heat exchanger (67) to cool the inverter (72).

<Heating Operation>

Heating operation is classified into an operation using the outdoor heat exchanger (13) and an operation not using the outdoor heat exchanger (13). The operation not using the outdoor heat exchanger (13) is the operation that will be performed when the heating capacity of the indoor unit (3) is in equilibrium with the total cooling capacity of both of the chiller unit (4) and the freezer unit (5), i.e., an operation in which heat balance is kept between both the heat utilization side units. In this operation, heat need not be released to the outside through the outdoor heat exchanger (13), and therefore useless heat exchange can be avoided. This promotes energy saving.

First, the heating operation using the outdoor heat exchanger (13) will be described. In this operation, the four-way selector valve (15) is set into a position (second position) in which the first port communicates with the fourth port and the second port communicates with the third port. The electronic expansion valve (27) in the outdoor unit (2) is set into an open position, and its opening is adequately adjusted in accordance with operating conditions.

Figure 5:
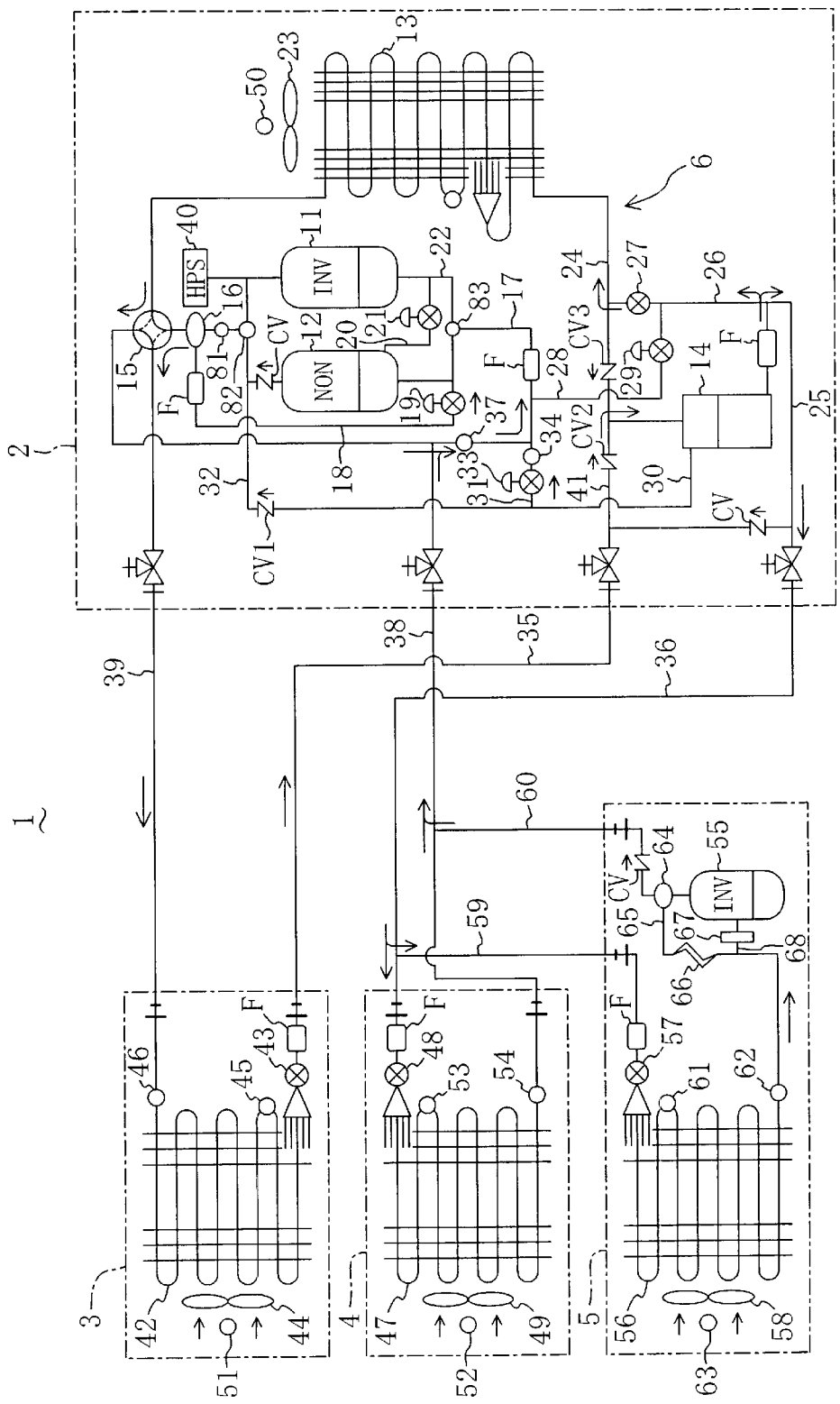
FIG. 5 is a refrigerant circuit diagram for illustrating the circulation behavior of the refrigerant during a heating operation using an outdoor heat exchanger.

The refrigerant in the refrigerant circuit (6) circulates as shown in FIG. 5. More specifically, the refrigerant discharged from the compressors (11, 12) flows into the indoor unit (3) and condenses in the indoor heat exchanger (42) to heat room air. The effluent refrigerant from the indoor heat exchanger (42) returns to the outdoor unit (2) and flows into the receiver (14). The effluent refrigerant from the receiver (14) is divided into two flows: one of the refrigerant flows is reduced in pressure by the electronic expansion valve (27) and then evaporates in the outdoor heat exchanger (13), while the other refrigerant flow runs out of the outdoor unit (2) and is divided into a flow toward the chiller unit (4) and a flow toward the freezer unit (5). In the chiller unit (4) and the freezer unit (5), cooling and freezing are performed, respectively, in the same manner as in the above-described cooling operation. The effluent refrigerant flows from the chiller unit (4) and the freezer unit (5) merge with each other and then flow into the outdoor unit (2). The influent refrigerant in the outdoor unit (2) merges with the effluent refrigerant from the outdoor heat exchanger (13), and is then sucked into the compressors (11, 12). The refrigerant is compressed by the compressors (11, 12) and repeats the circulation behavior as described above.

Next, the heating operation not using the outdoor heat exchanger (13) will be described. Also in this heating operation, the four-way selector valve (15) is set into the position in which the first port communicates with the fourth port and the second port communicates with the third port. In this heating operation, however, the electronic expansion valve (27) in the outdoor unit (2) is set into a fully closed position.

Figure 6:
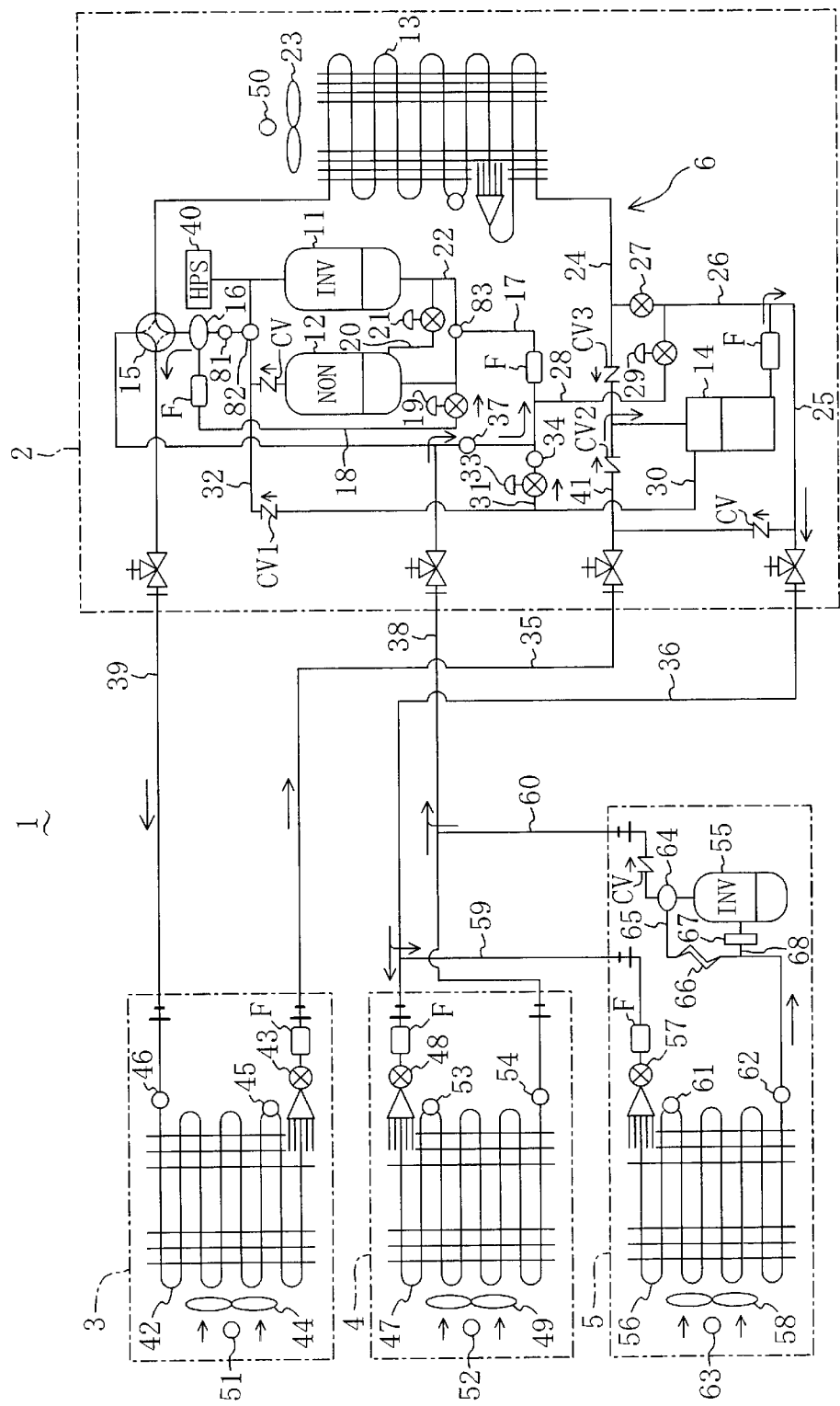
FIG. 6 is a refrigerant circuit diagram for illustrating the circulation behavior of the refrigerant during another heating operation not using the outdoor heat exchanger.
Figure 7:
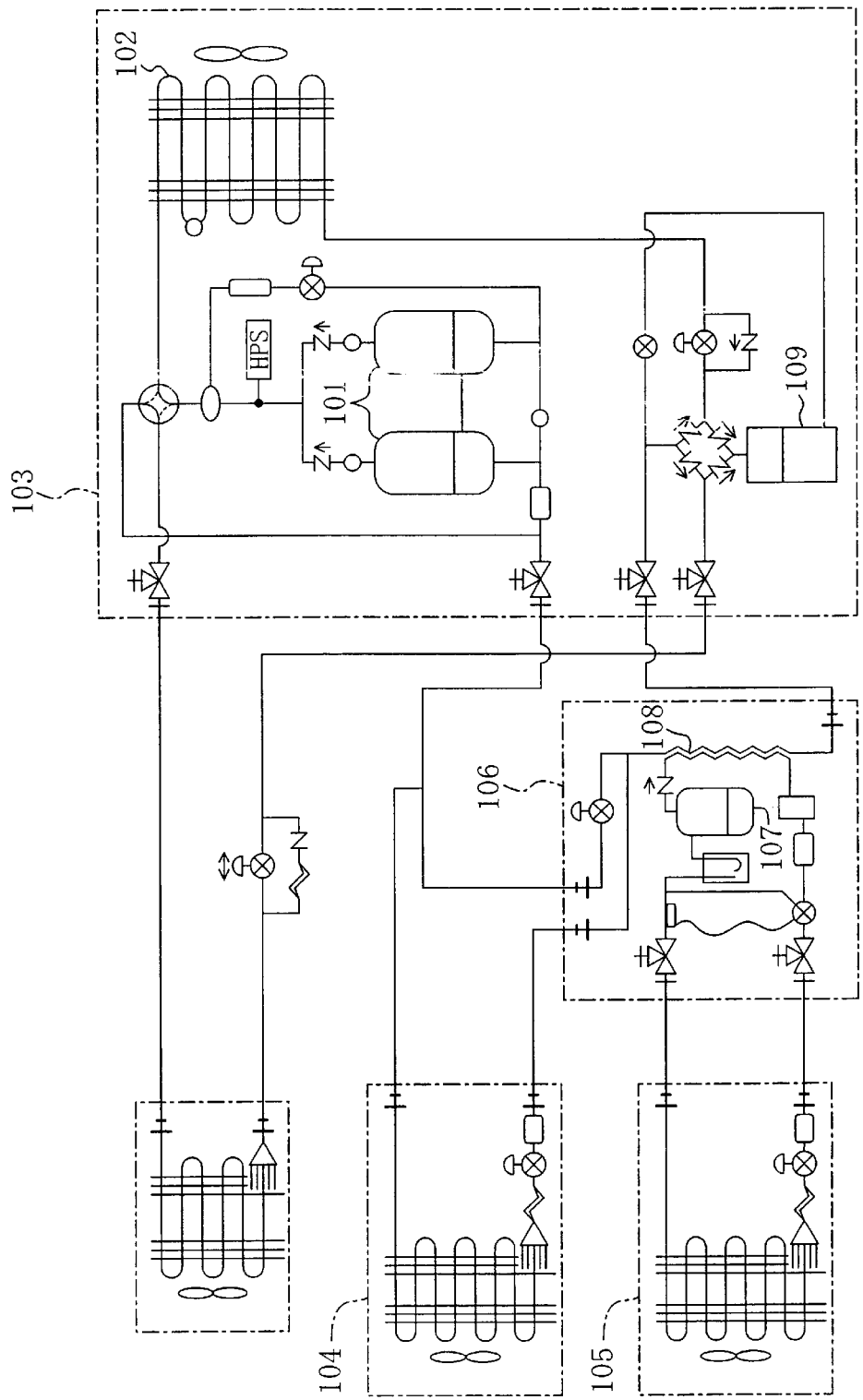
FIG. 7 is a refrigerant circuit diagram of a conventional refrigeration system.

The refrigerant in the refrigerant circuit (6) circulates as shown in FIG. 6. More specifically, the refrigerant discharged from the compressors (11, 12) flows into the indoor unit (3) and condenses in the indoor heat exchanger (42) to heat room air. The effluent refrigerant from the indoor heat exchanger (42) returns to the outdoor unit (2) and flows into the receiver (14). The effluent refrigerant from the receiver (14) flows out of the outdoor unit (2), and is divided into a flow toward the chiller unit (4) and a flow toward the freezer unit (5). In the chiller unit (4) and the freezer unit (5), cooling and freezing are performed, respectively, in the same manner as in the above-described cooling operation. The effluent refrigerant flows from the chiller unit (4) and the freezer unit (5) merge with each other and then flow into the outdoor unit (2). The influent refrigerant into the outdoor unit (2) is sucked into the compressors (11, 12). The sucked refrigerant is compressed by the compressors (11, 12) and repeats the circulation behavior as described above.

Effects

As can be understood from the above, in this refrigeration system, the freezer unit (5) is provided with a freezing compressor (55) for two-stage compression to establish a two-stage compression refrigeration cycle, so that a cascade unit can be eliminated. Hence, space saving and cost reduction for the system can be achieved.

The oil separator (64) is provided on the discharge pipe of the freezing compressor (55) so that the refrigeration oil separated by the oil separator (64) is returned to the suction side of the freezing compressor (55) through the oil return pipe (65). This prevents lubrication failure in the freezing compressor (55). Further, since the oil return pipe (65) equalizes the pressures between the discharge and suction sides of the freezing compressor (55), it can be prevented that the refrigeration oil flows backward during the shutdown of the freezing compressor (55). This enhances the reliability of the freezing compressor (55).

Since the inlet pipe (68) is provided with the heat exchanger (67) for cooling the inverter (72), the inverter (72) can be cooled with the refrigeration oil recovered through the oil return pipe (65) and a suction refrigerant. Therefore, the inverter (72) can be cooled without using any external cooling source. Such prevention of overheating of the inverter (72) further enhances the reliability of the freezing compressor (55).

Modifications

Though the heat exchanger (67) for cooling the inverter (72) is provided on the inlet pipe (68) in the above embodiment, the heat exchanger (67) may be provided on the oil return pipe (65). In this case, the inverter (72) would be cooled by the refrigeration oil only, but still the same effects could be achieved.

Though the freezing compressor (55) in the freezer unit (5) is formed by an inverter compressor in the above embodiment, the freezing compressor (55) may be a fixed capacity type compressor. It will be noted that in this case, the inverter (72) can be dispensed with, and therefore the heat exchanger (67) for cooling the inverter (72) can also be dispensed with.

In the above embodiment, the indoor unit (3), the chiller unit (4) and the freezer unit (5) provided are each singular in number. At least one of the units (3, 4, 5), however, may be provided in plurality. A plurality of the outdoor units (2) may be provided.

The refrigeration system (1) may be formed by the outdoor unit (2), the chiller unit (4) and the freezer unit (5). In other words, the unit (3) for air conditioning may not necessarily be provided. Alternatively, the refrigeration system (1) may be formed by the outdoor unit (2), the indoor unit (3) and the freezer unit (5). In other words, the chiller unit (4) may not necessarily be provided. Such systems can also exhibit the above-described effects.

It is apparent to those skilled in the art that the present invention is not limited to the above embodiment but can be put into practice in various other forms without departing from the sprit and scope of the invention.

Thus, the above embodiment is illustrative only in all respects but is not to be construed to limit the scope of the invention. The scope of the invention is defined by the appended claims but is not restricted by the description itself. Further, changes and modifications which falls within equivalents of the claims are also within the scope of the invention.

What is claimed is:

1. A refrigeration system comprising a refrigerant circuit formed by connecting at least all of:
   a heat source side unit having a heat source side compressor and a heat source side heat exchanger;
   a room air conditioning unit having an indoor heat exchanger for heating or cooling room air;
   a chiller unit having a chilling heat exchanger for cooling an object being cooled; and
   a freezer unit having a freezing heat exchanger for cooling an object being cooled at a lower temperature than the chilling heat exchanger,
   wherein the freezer unit is provided with a freezing compressor for compressing a refrigerant in a total of two stages together with the heat source side compressor.

2. The refrigeration system of claim 1,
   wherein the freezer unit includes a pressure reduction mechanism and is connected to a liquid-side pipe branched from a liquid line of the heat source side unit and a gas-side pipe branched from a gas line of the heat source side unit, and wherein the freezer unit is constructed so that in a direction from the liquid-side pipe to the gas-side pipe, the pressure reduction mechanism, the freezing heat exchanger and the freezing compressor are connected in this order.

3. The refrigeration system of claim 2, wherein the freezer unit is provided with: an oil separator disposed on the discharge side of the freezing compressor; and an oil return pipe which have a pressure reduction mechanism and connects the oil separator to the suction side of the freezing compressor therethtough.

4. The refrigeration system of claim 3,
   wherein the freezing compressor is formed by an inverter compressor, and wherein the oil return pipe in the freezer unit or an inlet pipe of the freezing compressor is provided with a heat exchanger for cooling an inverter in the inverter compressor with at least a refrigeration oil separated by the oil separator.

5. The refrigeration system of claim 1, wherein the freezer unit is provided with: an oil separator disposed on the discharge side of the freezing compressor; and an oil return pipe which have a pressure reduction mechanism and connects the oil separator to the suction side of the freezing compressor therethrough.

6. The refrigeration system of claim 5,
   wherein the freezing compressor is formed by an inverter compressor, and wherein the oil return pipe in the freezer unit or an inlet pipe of the freezing compressor is provided with a heat exchanger for cooling an inverter in the inverter compressor with at least a refrigeration oil separated by the oil separator.

7. A refrigeration system comprising a refrigerant circuit formed by connecting at least all of:
   a heat source side unit having a heat source side compressor and a heat source side heat exchanger;
   a chiller unit having a chilling heat exchanger for cooling an object being cooled; and
   a freezer unit having a freezing heat exchanger for cooling an object being cooled at a lower temperature than the chilling heat exchanger,
   wherein the freezer unit includes a freezing compressor for compressing a refrigerant in a total of two stages together with the heat source side compressor; a pressure reduction mechanism connected to a liquid-side pipe branched from a liquid line of the heat source side unit and a gas-side pipe branched from a gas line of the heat source side unit; an oil separator disposed on a discharge side of the freezing compressor; and an oil return pipe including a second pressure reduction mechanism and connects the oil separator to a suction side of the freezing compressor therethrough, with the freezer unit being constructed so that in a direction from the liquid-side pipe to the gas-side pipe, pressure reduction mechanism, the freezing heat exchanger and the freezing compressor are connected in this order.

8. The refrigeration system of claim 7,
   wherein the freezing compressor is formed by an inverter compressor, and
   wherein the oil return pipe in the freezer unit or an inlet pipe of the freezing compressor is provided with a heat exchanger for cooling an inverter in the inverter compressor with at least a refrigeration oil separated by the oil separator.

9. A refrigeration system comprising a refrigerant circuit formed by connecting at least all of:
   a heat source side unit having a heat source side compressor and a heat source side heat exchanger;
   a chiller unit having a chilling heat exchanger for cooling an object being cooled; and
   a freezer unit having a freezing heat exchanger for cooling an object being cooled at a lower temperature than the chilling heat exchanger,
   wherein the freezer unit includes a freezing compressor for compressing a refrigerant in a total of two stages together with the heat source side compressor, an oil separator disposed on a discharge side of the freezing compressor; and an oil return pipe including a pressure reduction mechanism connecting the oil separator to a suction side of the freezing compressor therethrough.

10. The refrigeration system of claim 9,
    wherein the freezing compressor is formed by an inverter compressor, and wherein the oil return pipe in the freezer unit or an inlet pipe of the freezing compressor is provided with a heat exchanger for cooling an inverter in the inverter compressor with at least a refrigeration oil separated by the oil separator.

11. A refrigeration system comprising a refrigerant circuit formed by connecting at least all of:
    a heat source side unit having a heat source side compressor and a heat source side heat exchanger;
    a room air conditioning unit having an indoor heat exchanger for heating or cooling room air; and
    a freezer unit having a freezing heat exchanger for cooling an object being cooled, wherein the freezer unit includes a freezing compressor for compressing a refrigerant in a total of two stages together with the heat source side compressor; a pressure reduction mechanism connected to a liquid-side pipe branched from a liquid line of the heat source side unit and a gas-side pipe branched from a gas line of the heat source side unit; an oil separator disposed on a discharge side of the freezing compressor; and an oil return pipe including a second pressure reduction mechanism and connects the oil separator to a suction side of the freezing compressor therethrough, with the freezer unit being constructed so that in a direction from the liquid-side pipe to the gas-side pipe, the pressure reduction mechanism, the freezing heat exchanger and the freezing compressor are connected in this order.

12. The refrigeration system of claim 11, wherein the freezing compressor is formed by an inverter compressor, and wherein the oil return pipe in the freezer unit or an inlet pipe of the freezing compressor is provided with a heat exchanger for cooling an inverter in the inverter compressor with at least a refrigeration oil separated by the oil separator.

13. A refrigeration system comprising a refrigerant circuit formed by connecting at least all of:

a heat source side unit having a heat source side compressor and a heat source side heat exchanger;

a room air conditioning unit having an indoor heat exchanger for heating or cooling room air; and a freezer unit having a freezing heat exchanger for cooling an object being cooled, wherein the freezer unit includes a freezing compressor for compressing a refrigerant in a total of two stages together with the heat source side compressor, an oil separator disposed on a discharge side of the freezing compressor; and an oil return pipe including a pressure reduction mechanism connecting the oil separator to a suction side of the freezing compressor therethrough.

14. The refrigeration system of claim 13, wherein the freezing compressor is formed by an inverter compressor, and wherein the oil return pipe in the freezer unit or an inlet pipe of the freezing compressor is provided with a heat exchanger for cooling an inverter, in the inverter compressor with at least a refrigeration oil separated by the oil separator.

* * * * *

UNITED STATES PATENT AND TRADEMARK OFFICE
CERTIFICATE OF CORRECTION

PATENT NO. : 6,722,156 B2
DATED : April 20, 2004
INVENTOR(S) : Kenji Tanimoto et al.

It is certified that error appears in the above-identified patent and that said Letters Patent is hereby corrected as shown below:

Column 9,
Line 46, "wherein" should begin another line.

Column 10,
Lines 48 and 61, "wherein" should begin another line.

Signed and Sealed this

Fourteenth Day of September, 2004

JON W. DUDAS
*Director of the United States Patent and Trademark Office*